(12) United States Patent
Haerle et al.

(10) Patent No.: US 11,529,995 B2
(45) Date of Patent: Dec. 20, 2022

(54) HOLLOW-CHAMBER PROFILE FOR FASTENING A BATTERY MODULE

(71) Applicant: Bayerische Motoren Werke Aktiengesellschaft, Munich (DE)

(72) Inventors: Simon Haerle, Munich (DE); Philip Raettich, Bidingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 404 days.

(21) Appl. No.: 16/774,961

(22) Filed: Jan. 28, 2020

(65) Prior Publication Data

US 2020/0168868 A1 May 28, 2020

Related U.S. Application Data

(63) Continuation of application No. PCT/EP2018/069329, filed on Jul. 17, 2018.

(30) Foreign Application Priority Data

Jul. 31, 2017 (DE) ..................... 10 2017 213 202.7

(51) Int. Cl.
*B62D 21/09* (2006.01)
*B60K 1/04* (2019.01)
*H01M 50/20* (2021.01)

(52) U.S. Cl.
CPC ................ *B62D 21/09* (2013.01); *B60K 1/04* (2013.01); *H01M 50/20* (2021.01); *H01M 2220/20* (2013.01)

(58) Field of Classification Search
CPC .... H01M 2220/20; H01M 50/20; Y02E 60/10
See application file for complete search history.

(56) References Cited

U.S. PATENT DOCUMENTS

| 5,501,289 A | 3/1996 | Nishikawa et al. |
| 2003/0136077 A1 | 7/2003 | Gregori |

(Continued)

FOREIGN PATENT DOCUMENTS

| DE | 91 16 442 U1 | 3/1993 |
| DE | 196 37 243 A1 | 3/1998 |

(Continued)

OTHER PUBLICATIONS

PCT/EP2018/069329, International Search Report dated Oct. 17, 2018 (Two (2) pages).

(Continued)

*Primary Examiner* — Cynthia H Kelly
*Assistant Examiner* — Monique M Wills
(74) *Attorney, Agent, or Firm* — Crowell & Moring LLP

(57) ABSTRACT

A hollow-chamber profile for fastening a battery module in a vehicle includes a first side wall and a second side wall which lies opposite the first side wall, where the first side wall and the second side wall are connected to one another via a bottom wall. Additionally, the hollow-chamber profile has a top wall which lies opposite the bottom wall, where the top wall is designed to interact with at least one fastening device for fastening the battery module. The hollow-chamber profile has at least one intermediate wall which extends between the side walls from the top wall in the direction of the bottom wall, where a wall thickness of the at least one intermediate wall is dimensioned in such a way that the fastening device can be introduced at least partially into the wall thickness of the at least one intermediate wall.

8 Claims, 3 Drawing Sheets

(56) References Cited

U.S. PATENT DOCUMENTS

| | | | | |
|---|---|---|---|---|
| 2006/0109610 A1* | 5/2006 | Liu | ................. | H02J 7/0045 361/600 |
| 2015/0311486 A1* | 10/2015 | Kwag | ................. | H01M 50/20 429/7 |
| 2017/0033421 A1* | 2/2017 | Curfew | ................. | H01M 50/20 |

FOREIGN PATENT DOCUMENTS

| | | |
|---|---|---|
| DE | 10 2015 112 495 A1 | 2/2017 |
| EP | 2 332 761 A1 | 6/2011 |

OTHER PUBLICATIONS

German Search Report issued in German counterpart application No. 10 2017 213 202.7 dated Aug. 11, 2017, with Statement of Relevancy (Eight (8) pages).

* cited by examiner

HOLLOW-CHAMBER PROFILE FOR FASTENING A BATTERY MODULE

CROSS REFERENCE TO RELATED APPLICATIONS

This application is a continuation of PCT International Application No. PCT/EP2018/069329, filed Jul. 17, 2018, which claims priority under 35 U.S.C. § 119 from German Patent Application No. 10 2017 213 202.7, filed Jul. 31, 2017, the entire disclosures of which are herein expressly incorporated by reference.

BACKGROUND AND SUMMARY OF THE INVENTION

The present invention relates to an extruded hollow-chamber profile for fastening a battery module in a vehicle.

Currently, for the purpose of fastening the battery modules in high-voltage storage devices, aluminum press-drawn profiles are used, to which the battery modules are clamped. The aluminum press-drawn profiles in this case usually have two side walls, which are substantially parallel to each other, are connected to each other via a bottom wall, and which are closed, on the side opposite the bottom wall, by means of a top wall. To enable a screwed connection to be constituted in the press-drawn profile, bores are first made in the top walls of the extruded profile, and then threaded bushings are pressed or welded into these bores, or plate metal strips, having pressed-in/welded-in nuts, are inserted, or fitted, into the bores.

The insertion of threaded bushings, or nuts, in this case is associated with high production costs and with an increased amount of assembly work, because of the high number of individual parts that have to be joined together. Moreover, the press-drawn profile becomes weakened, especially in the region of introduction of force, as a result of the insertion of the threaded bushing, such that cracks in material, which can occur when the bushings are pressed in, may result in defective fastening of the battery modules.

Moreover, the insertion of the weld nuts into the profile results in very heavy components. Furthermore, the high surface pressure, in the case of the plate metal strips, and the heat-affected zone, in the case of welding, likewise result in weakening of the profile, in particular in the region of introduction of force, such that, in the case of the other, alternative known fastening possibility, also, the service life may be reduced and reliable fastening of the battery modules cannot be ensured.

Furthermore, in the case of the known profiles, if the fastening means for the battery module are tightened beyond the elastic limit, the profile as a whole may become deformed, which likewise may result in a premature failure. In order to counteract this deformation, the profile must be designed to be as solid as possible, and this consequently involves a large amount of weight, and thus higher costs.

It is therefore the object of the present invention to provide a press-drawn profile, for fastening a battery module in high-voltage storage devices, that mitigates the above-mentioned disadvantages.

Provided in the following is a hollow-chamber profile for fastening a battery module in a vehicle, wherein the hollow-chamber profile has a first side wall and a second side wall that is opposite the first side wall, a bottom wall that joins the first and second side wall, and a top wall that is opposite the bottom wall. In this case, the side walls, and the bottom and top walls, may preferably be substantially parallel to each other.

The term "substantially parallel" in this context means that the walls may be actually parallel to each other, but it is also possible for the two walls to be offset in relation to each other only in the direction of the respectively other wall, such that they may also be at an angle in relation to each other.

In addition, the top wall acts in combination with at least one fastening means, in particular a screw, for the purpose of fastening the battery module.

In order to mitigate the disadvantages of the prior art that are associated with the use of additional threaded bushings, the proposed hollow-chamber profile has at least one intermediate wall, which extends, between the side walls, from the top wall toward the bottom wall, wherein a wall thickness of the at least one intermediate wall is dimensioned in such a manner that the fastening means can be inserted at least partly into the wall thickness of the at least one intermediate wall. The wall thickness in this case may be selected in such a manner that, when in the inserted state, the fastening means is completely surrounded by the material of the intermediate wall, but it is also possible for the fastening means, when in the fitted state, to be only partly surrounded by the material of the intermediate wall. Thus, for example, a screw can be screwed-in directly, or a bore can be made directly, in the intermediate wall. The functions of the threaded bushing can thus be assumed by the intermediate wall itself, such that it is possible to dispense with the use of a threaded bushing.

In order to provide a hollow-chamber profile that is as light as possible, the hollow-chamber profile may, instead of the solid intermediate wall, also have a first and a second intermediate wall, which are spaced apart from each other and which between them realize a cavity, into which the fastening means can be inserted. Advantageously in this case, the wall thickness of the first and second intermediate wall is reduced, in comparison with an exemplary embodiment having a single, solid intermediate wall, such that there can be savings in weight, material and costs. Moreover, such a design ensures that the fastening means is supported by the top wall, not only at the intermediate walls, but is also supported on the top side in the region of the cavity. Furthermore, the overall stability of the profile can be increased by this design.

In addition, in order to save yet more weight, the top wall may have a first top-wall portion, which is connected to the first side wall and to the first intermediate wall, and a second top-wall portion, which is connected to the second side wall and to the second intermediate wall, wherein the first and the second intermediate wall between them realize a slot, into which the fastening means can be inserted.

Also because of this slot, realized by the intermediate walls, it is possible to dispense with the use of a threaded bushing, since the slot provided integrally by the hollow-chamber profile can assume the functions of the threaded bushing.

Additionally, there may be provided in the hollow-chamber profile at least one stiffening wall, which extends, between the bottom wall and the top wall, from the first side wall to the second side wall, and/or at least one first stiffening-wall portion is provided, which extends from one of the side walls as far as the at least one intermediate wall. It can thereby be ensured that, even in the case of thin-walled hollow-chamber profiles, the shape of the hollow-chamber profile remains largely unchanged, even in the case of introduction of a large amount of force. It is also possible in this case to provide a plurality of stiffening walls, or stiffening-wall portions, which, in particular, support the intermediate walls in order to ensure a particularly good hold of the fastening means.

To achieve yet better assumption of the function of the threaded bush, it is additionally advantageous if the at least one intermediate wall extends at least as far as the stiffening wall and/or a stiffening-wall portion, and is connected thereto. As a result, not only the side walls, but also the at least one, or the first and the second, intermediate wall can be held in a dimensionally stable manner in their position, such that the shape of the intermediate wall, or of the cavity, or slot, remains constant along the intermediate wall, even in the case of introduction of a large amount of force.

Furthermore, the stiffening wall may be a single piece, and thus realize a cavity bottom, or slot base, but it is also possible for the stiffening wall to have a first stiffening-wall portion, which extends from the first side wall as far as the first intermediate wall, and to have a second stiffening-wall portion, which extends from the second side wall as far as the second intermediate wall. Such a design ensures that particularly large fastening means can also be received in the slot.

According to a further exemplary embodiment, a diameter of the fastening means is less than the wall thickness W of the intermediate wall, or is greater than an inside width of the slot defined by the intermediate walls, and a wall thickness of the intermediate wall is dimensioned in such a manner that the fastening means, even when having been inserted in the slot, is surrounded by sufficient material for the hollow-chamber profile not to be damaged. Alternatively or additionally, a diameter of the fastening means is greater than the wall thickness W of the intermediate wall, or is greater than an inside width of the slot, defined by the intermediate walls, and the wall thicknesses W of the intermediate wall, wherein in this case, also, a wall thickness of the intermediate wall is dimensioned in such a manner that the fastening means, even when having been inserted in the slot, is surrounded by sufficient material for the hollow-chamber profile not to be damaged. The wall thickness in this case may be adapted, in particular, to the anticipated introduction of force. According to a particularly advantageous exemplary embodiment, the diameter D of the fastening element, the wall thickness W of the intermediate wall(s) and/or the inside width B of the slot are selected in such a manner that it is the case that:

$|W-D|$ or $|(2W+B)-D|>=0.5$ mm.

According to a further advantageous exemplary embodiment, the wall thickness of the intermediate wall is adapted in such a manner that the wall thickness is up to 30% less than a diameter of the fastening element. As a result, the intermediate wall is sufficiently stiff, the load capacity of the fastening means, for example of a thread, is sufficiently high, and the mass per unit area of the extruded profile is minimized.

This means, for example in the case of a screw being used as a fastening means, that the screw is screwed into the material of the side wall, but does not break through this material. It can thereby be ensured that, on the one hand, the fastening means is securely fastened in the slot and, on the other hand, the intermediate wall does not undergo material fatigue, even in the case of introduction of a large amount of force. In particular, it is advantageous in this case if, when the fastening means has been inserted, the remaining wall thickness is at least ⅛, better ¼, and yet better ⅓ of the original wall thickness. It can thereby be ensured that, even in the region of the fastening means, the intermediate wall(s) maintains/maintain a sufficient stability, and a sufficient hold is ensured for the fastening means. As a result, material stability and integrity can also be ensured, even in the case of introduction of a large amount of force.

According to a further advantageous exemplary embodiment, a height of the intermediate wall is adapted in such a manner that the height is at least double, preferably three times, an inside width of the slot defined by the intermediate walls and/or a diameter of the fastening element. The relationship, of height H to diameter D, H/D>2, is thus advantageous. It can thereby be ensured that the fastening means is also sufficiently supported in its longitudinal direction by the material of the intermediate wall, such that, here also, no damage to the intermediate walls can occur, even in the case of introduction of a large amount of force.

According to a further advantageous exemplary embodiment, the fastening means is a screw and/or a bore into which the screw can be inserted. It is likewise possible for a thread to be cut into the side walls, via the bore. Also possible is the use of self-tapping screws, which cut a thread into the intermediate walls as they are being screwed into the intermediate wall, the cavity, or the slot.

According to a further exemplary embodiment, the hollow-chamber profile is an extrusion profile, in particular a press-drawn profile and/or an aluminum press-drawn profile. Such profiles can be produced easily and inexpensively, and have a low weight.

Further advantages and advantageous embodiments are specified in the description, the drawings and the claims. In this case, in particular, the combinations of the features specified in the description and in the drawing are purely exemplary, such that the features may also be present singly or in other combinations.

The invention is to be described in greater detail in the following on the basis of exemplary embodiments represented in the drawings. In this case, the exemplary embodiments and the combinations shown in the exemplary embodiments are purely exemplary, and are not intended to define the scope of protection of the invention. The scope of protection is defined solely by the appended claims.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, parts that are the same are denoted by the same references.

Figure 1:
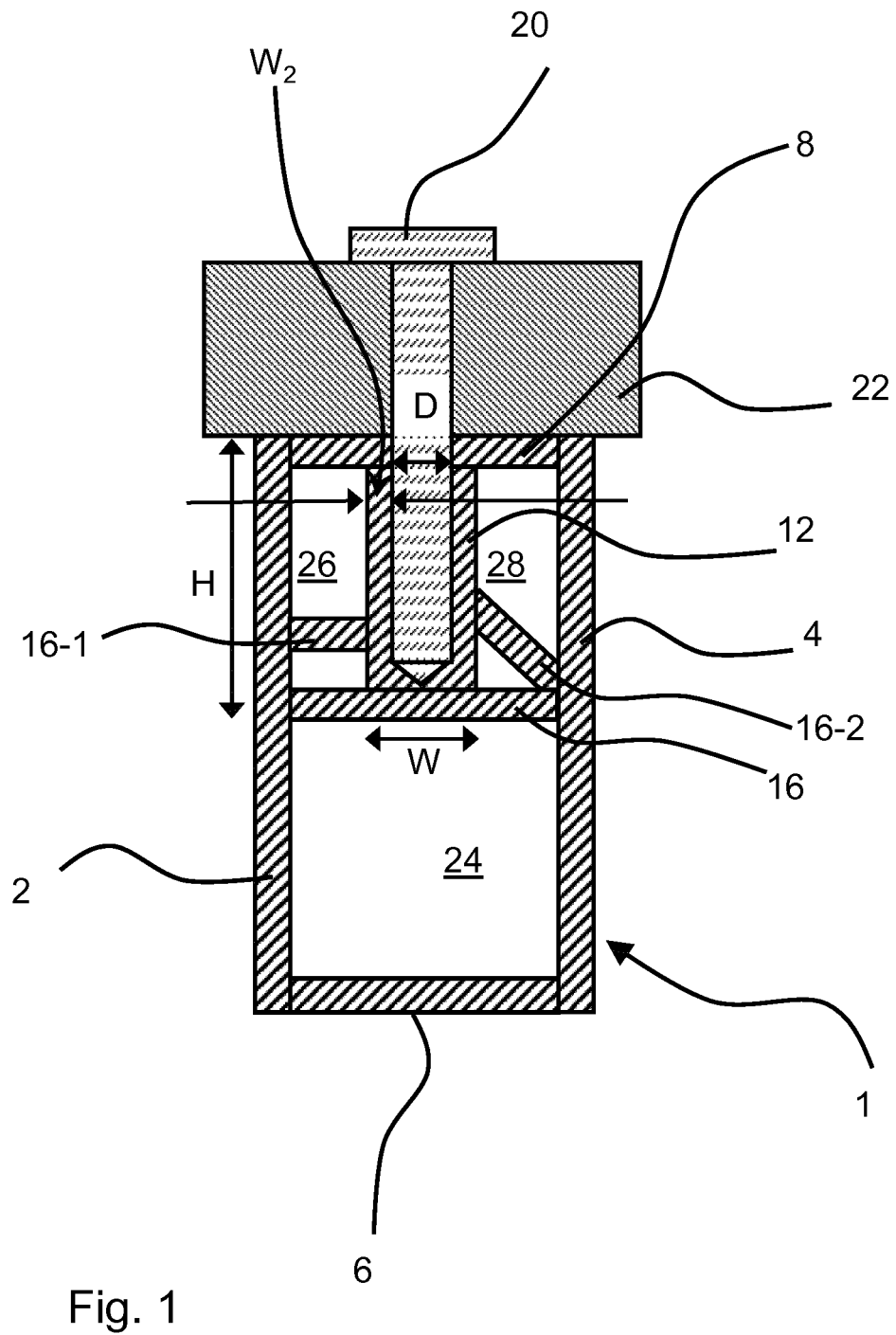
FIG. 1 is a schematic sectional view through a hollow-chamber profile according to a first exemplary embodiment of the present invention.

FIG. 1 shows a cross section through a hollow-chamber profile 1, in particular an extruded press-drawn profile 1, the hollow-chamber profile 1 having a first side wall 2 and a second side wall 4, which are connected to each other via a bottom wall 6. In addition, FIG. 1 shows that, provided opposite the bottom wall 6, there is a top wall 8, which likewise is connected to the side walls 2, 4.

It can additionally be seen from FIG. 1 that the hollow-chamber profile 1 has an intermediate wall 12, which is connected to the top wall 8 and to a stiffening wall 16, which extends between the side wall 2 and the side wall 4. A substantially parallel alignment of the walls 2, 4, 12, or 6 and 16, in relation to each other is particularly advantageous.

As an alternative or in addition to the stiffening wall 16 extending between the side walls 2, 4, there may also additionally be provided, between the intermediate wall 12 and the side walls 2 and 4, respectively, further stiffening-wall portions 16-1, 16-2, which may also extend obliquely, as is represented schematically.

As is additionally shown by FIG. 1, the side walls 2, 4 and the bottom wall 6 realize a cavity 24, and the intermediate wall 12, the stiffening wall 16, the side walls 2, 4 and the top wall 8 form a respective cavity 26, 28, which cavities have the effect that the hollow-chamber profile 1 as a whole is realized as a very light component.

As is further represented in FIG. 1, the wall thickness W of the intermediate wall 12 is dimensioned in such a manner that a fastening means 20 can be inserted into the intermediate wall 12 in order to fasten to the hollow-chamber profile 1 an element 22 that is to be fastened. The fastening means in this case may be a screw, which is screwed directly into the intermediate wall 12. It is also possible, however, that a thread or a bore is first realized in the intermediate wall 12, which thread or bore then, in turn, acts in combination with a screw or another type of fastening element. The intermediate wall 12 thus assumes the functions of the threaded bushing, such that it is possible to dispense with additional insertion of a bushing or nut.

In order to provide a particularly good hold of the fastening means 20 in the intermediate wall 12, it is particularly preferred if a height H of the intermediate walls 12 is at least double, preferably three times, or a multiple of the diameter D of the fastening means 20. Owing to this height to diameter relationship, of H/D>2, it can be ensured that the fastening means is securely received in the intermediate wall 12 and that, even in the case of introduction of a large amount of force, pulling of the fastening means 20 out of the hollow-chamber profile 1, or damage to the profile, is reliably prevented.

In addition, a diameter D of the fastening means 20 or of the bore may extend over the entire wall thickness W of the wall 12, so as to create a cavity that transitions into the cavities 26, 28 at the side of the intermediate wall 12. The diameter D of the fastening means 20 in this case may be selected, for example, so as to be up to 30% greater than the available wall thickness.

Alternatively the fastening means 20, in particular the bore, or also the screw element, may be dimensioned in such a manner that the diameter D of the fastening means 20 is less than the wall thickness W of the intermediate wall 12. In particular, it is advantageous in this case if at least 15% of the original wall thickness W remains at the side of the fastening means 20 (wall thickness $W_2$). An empirical minimum residual wall thickness is in the region of, for example, 0.5 mm. The anticipated forces can thereby still be absorbed, without the risk of pulling-out or breaking-out of the fastening means. Clearly, the wall thickness can be adapted to the anticipated load.

Figure 2:
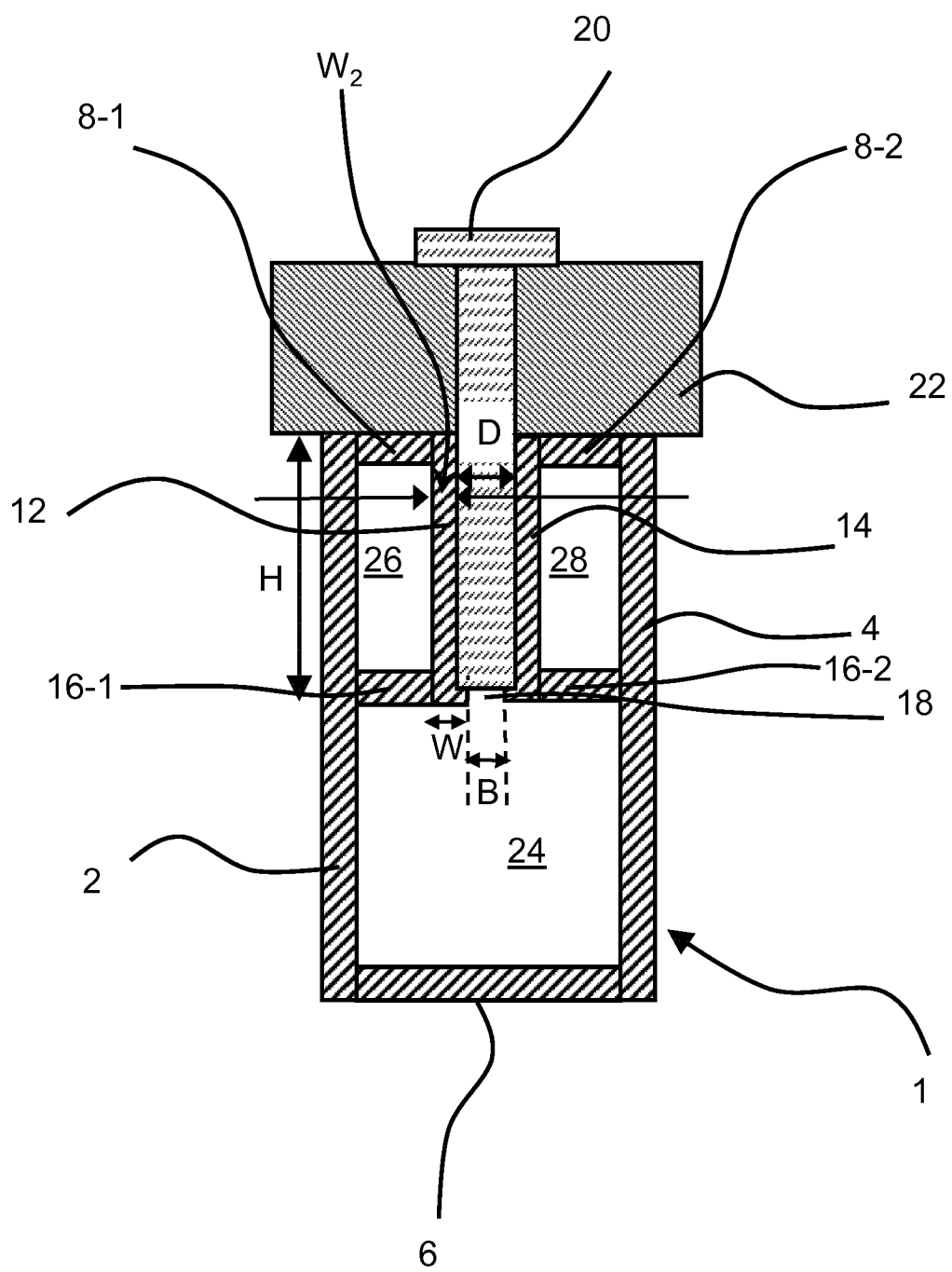
FIG. 2 is a schematic sectional view through a hollow-chamber profile according to a second exemplary embodiment of the present invention.

FIG. 2 shows a further preferred exemplary embodiment, in which the hollow-chamber profile 1 has a first intermediate wall 12 and a second intermediate wall 14, which are connected to a first top-wall portion 8-1 and to a second top-wall portion 8-2, respectively. The first and the second intermediate wall 12, 14 in this case are opposite the side walls 2, 4 and each other. Again, particularly advantageous in this case is a substantially parallel alignment of the walls 2, 4, 12, 14 in relation to each other.

In order to ensure the alignment, or the substantially parallel course of the intermediate walls 12, 14 in relation to the side walls 2, 4, and also in order that the intermediate walls 12, 14 do not buckle, even in the case of introduction of a large amount of force, the hollow-chamber profile 1 additionally has a first stiffening-wall portion 16-1 and a second-stiffening wall portion 16-2, which connect the first and the second intermediate wall 12, 14, respectively, to the associated first and second side wall 2, 4, respectively, and which are supported thereon. As represented in FIG. 2, the stiffening wall 16 may have two portions 16-1, 16-2, which connect the side walls 2, 4 to the respective intermediate walls 12, 14, but it is also possible to realize the stiffening wall 16, as shown in FIG. 1, as a continuous wall, which connects the two side walls 2, 4 to each other and to which the intermediate walls 12, 14 are joined. Likewise, it is possible for the stiffening-wall portions 16-1, 16-2 to run obliquely, or for further stiffening-wall portions to be provided, in particular supporting the intermediate walls 12, 14.

As can be seen from FIG. 2, the two intermediate walls 12, 14 between them realize a slot 18, in to which, as represented in FIG. 2, the fastening means 20 can be inserted in order to fasten to the hollow-chamber profile 1 the element 22 to be fastened. This slot 18 may be open (in the case of two stiffening-wall portions) or closed off, in which case, for example, the stiffening wall 16 then forms a slot base.

In the exemplary embodiment represented in FIG. 2, the fastening means 20 extends almost along the entire depth of the slot 18. It is also possible, however, that a longer fastening means is used, which extends into the cavity 24. In the case of an open slot 18, it can easily extend into the cavity 24. If, however, the slot 18 is closed off by the single-piece stiffening wall 16, openings, for example holes or bores, may be provided in the stiffening wall 16, or the slot base, which enable the fastening means 20 to pass through. Such an opening is represented, for example, in FIG. 3. However, the fastening means 20 may also be screwed directly into the stiffening wall 16, or into the slot base, or act in combination with it.

In order to provide a particularly good hold of the fastening means 20 in the slot 18, in this exemplary embodiment, also, it is particularly preferred if the height H of the intermediate walls 12, 14 is at least twice, preferably three times, or a multiple of the diameter D of the fastening means 20. Owing to this height to diameter relationship, of H/D>2, it can be ensured that the fastening means is securely received in the slot and that, even in the case of introduction of a large amount of force, pulling of the fastening means 20 out of the hollow-chamber profile 1, or damage to the profile, is reliably prevented.

Figure 3:
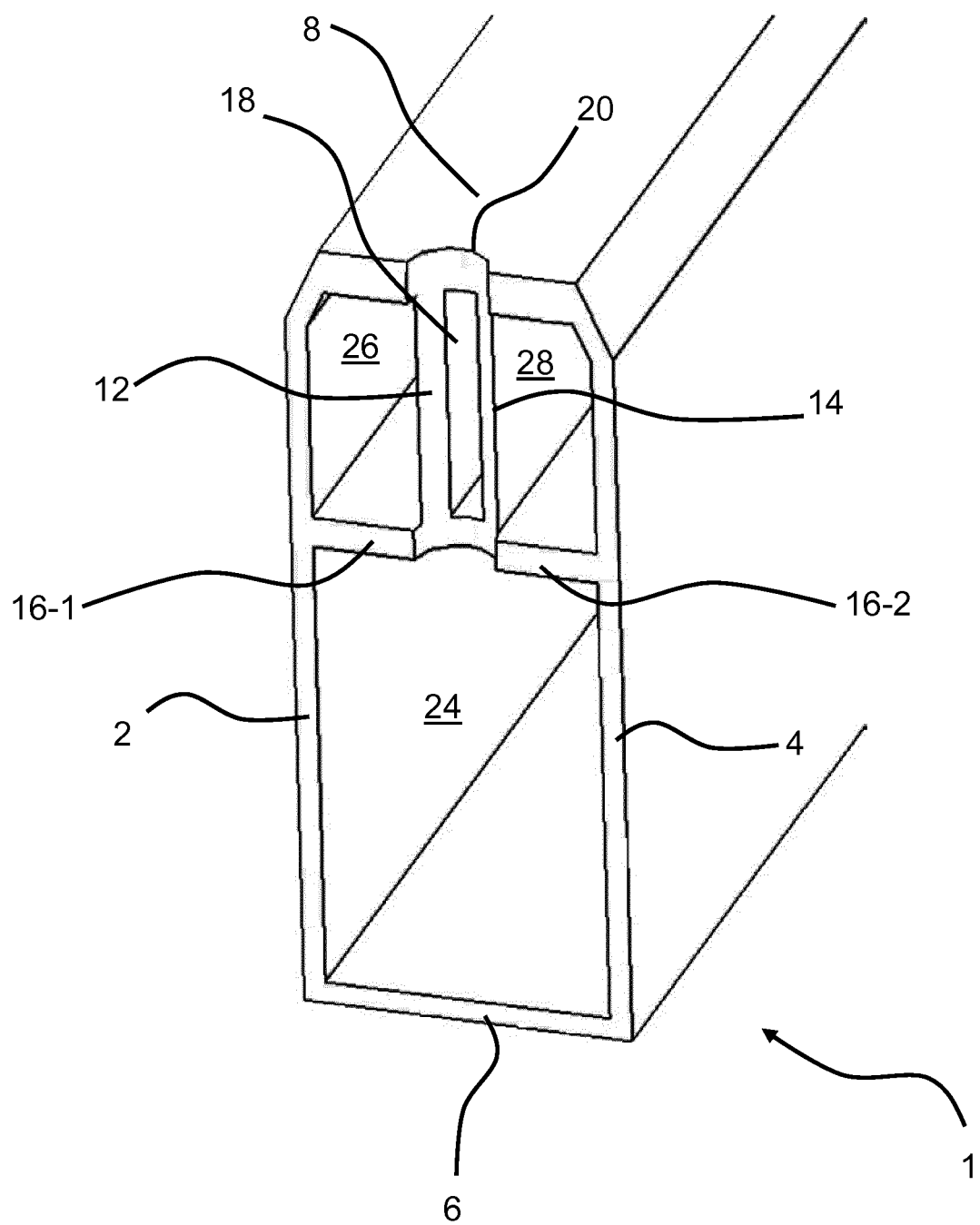
FIG. 3 is a three-dimensional view of a hollow-chamber profile according to a third exemplary embodiment of the present invention.

As an alternative to the hollow-chamber profile represented in FIG. 2, in which only one slot 18 is provided for receiving the fastening means 20, the hollow-chamber profile 1 may also, as represented in FIG. 3, have a continuous top wall 8 and a continuous stiffening wall 16, such that the slot 18 is defined as a cavity closed off by the intermediate walls 12, 14, the stiffening wall 16 and the top wall 8. In order to fasten a fastening means to this hollow-chamber profile, the fastening means may be screwed directly through the top wall 8, for example by use of self-tapping screws, but it is also possible, as shown in FIG. 3, to retroactively make bores in the hollow-chamber profile 1, which extend as far as the stiffening wall 16 (blind-hole bore), or even through the stiffening wall 16.

In addition, in a manner similar to the exemplary embodiment of FIG. 1, the diameter D of the bore may extend over the entire inside width B of the slot 18 and a thickness W of the walls 12, 14, such that a cavity 18 is created, which transitions into the cavities 26, 28 at the side of the intermediate walls 12, 14.

Alternatively, the fastening means 20, in particular the bore, or also the screw element, may be dimensioned in such a manner that the diameter D of the fastening means 20 is greater than the inside width B of the slot 18, but is less than the sums of inside width of the slot and the wall thickness W of the intermediate wall. Thus, it is the case that B<D< (B+2W). As a result, the intermediate walls 12, 14 are not broken through, such that particularly good fixing of the fastening means 20 in the slot 18 is possible.

In particular, it is advantageous in this case if only a slight portion of the wall thickness W of the side walls 12, 14 is overlapped by the fastening means, in particular the bore, or screw, such that, in the region of the fastening means, also, a sufficiently great wall thickness $W_2$ of the intermediate walls 12, 14 remains. This is represented schematically in FIGS. 1 and 2, in which it can clearly be seen that the ratio between wall thickness $W_2$, in the region of the fastening means, to wall thickness W, without fastening means, is such that sufficient wall material remains for good fastening, even in the case of introduction of a large amount of force. As a result, on the one hand, a particularly good and sufficient fastening of the fastening means in the slot can be provided. At the same time, however, there is sufficient material remaining at the side of the fastening means to prevent, for example, the intermediate wall 12, 14 from being broken through, and thus to prevent damage to the material. In this case, in particular, a minimum wall thickness, or projection of the fastening means, of approximately 0.5 mm is preferred. However, this may also be made thicker or thinner, according to the application and the anticipated introduction of force.

Depending on the dimension of the profile and the design of the fastening means, an optimum can thus be set between available supporting fastening surface in the slot and the weight of the hollow-chamber profile, such that a cost and weight optimum of the fastening can be provided with minimal use of material.

Overall, the design according to the invention of the press-drawn profile makes it possible to dispense with additional production steps, in particular producing and inserting threaded bushings, with the result that the costs for producing a fastening option for the battery module are significantly reduced. Furthermore, the extrusion profile according to the invention make it possible to achieve high component strength, with an equal or lesser weight, since there is no need for use of additional threaded bushings, and thus weakening of the material can be avoided. Furthermore, the component as a whole is greatly simplified. Thus, a lesser use of material and a lesser weight, and thus reduced costs, can be achieved by means of the press-drawn profile according to the invention.

List of Reference Characters
1 hollow-chamber profile
2, 4 side wall
6 bottom wall
8 top wall
8-1, 8-2 top-wall portion
12, 14 intermediate wall
16 stiffening wall
16-1, 16-2 stiffening-wall portion
18 slot
20 fastening means
22 fastening element
24, 26, 28 cavity
B inside width of the slot
D diameter of the fastening means
H height of the intermediate wall, or depth of the slot
W intermediate-wall thickness
$W_2$ intermediate-wall thickness in the region of the fastening means The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hollow-chamber profile for fastening a battery module in a vehicle, comprising:
   a first side wall;
   a second side wall, wherein the second side wall is opposite from the first side wall;
   a bottom wall, wherein the first side wall and the second side wall are connected to each other via the bottom wall;
   a top wall, wherein the top wall is opposite from the bottom wall and wherein the top wall is configured to act in combination with a fastening device for fastening the battery module; and
   a first intermediate wall and a second intermediate wall, wherein the first intermediate wall and the second intermediate walls extend, between the first side wall and the second side wall, from the top wall toward the bottom wall, wherein the first intermediate wall and the second intermediate wall are spaced apart from each other to define a cavity, and wherein a fastening device is insertable at least partly into the cavity.

2. The hollow-chamber profile according to claim 1, wherein the fastening device is a screw or a bore.

3. The hollow-chamber profile according to claim 1, wherein the top wall has a first top-wall portion which is connected to the first side wall and to the first intermediate wall and wherein the top wall has a second top-wall portion which is connected to the second side wall and to the second intermediate wall.

4. The hollow-chamber profile according to claim 1 further comprising a stiffening-wall portion which extends from the first side wall to the first intermediate wall or from the second side wall to the second intermediate wall.

5. The hollow-chamber profile according to claim 4, wherein the first and second intermediate walls extend at least as far as the stiffening-wall portion and are connected to the stiffening wall portion.

6. The hollow-chamber profile according to claim 1, wherein a diameter (D) of the fastening device is greater than an inside width (B) of the cavity or the diameter (D) is greater than the inside width (B) of the cavity and respective wall thicknesses (W) of the first and second intermediate walls and wherein:

$|(2W+B)-D|>0.5$ mm.

7. The hollow-chamber profile according to claim 1, wherein the first and second intermediate walls have a height (H), wherein the fastening device has a diameter (D), and wherein H/D>2.

8. The hollow-chamber profile according to claim 1, wherein the hollow-chamber profile is an extruded press-drawn profile and/or an aluminum press-drawn profile.

\* \* \* \* \*